(12) United States Patent
Raghunandan

(10) Patent No.: US 7,552,182 B2
(45) Date of Patent: Jun. 23, 2009

(54) METHOD, APPARATUS, AND COMPUTER PROGRAM PRODUCT FOR LENDING E-MAIL SPACE

(75) Inventor: Hulikunta Prahlad Raghunandan, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 11/765,837

(22) Filed: Jun. 20, 2007

(65) Prior Publication Data

US 2008/0109820 A1    May 8, 2008

Related U.S. Application Data

(63) Continuation of application No. 11/593,849, filed on Nov. 7, 2006.

(51) Int. Cl.
*G06F 15/16* (2006.01)
(52) U.S. Cl. ..................................... 709/206
(58) Field of Classification Search ............... 709/206, 709/213–219; 711/E12.089
See application file for complete search history.

(56) References Cited

U.S. PATENT DOCUMENTS 5,475,834 A * 12/1995 Anglin et al. ............... 707/203
7,406,505 B2 * 7/2008 Keohane et al. ............ 709/206

* cited by examiner

*Primary Examiner*—J Bret Dennison
(74) *Attorney, Agent, or Firm*—Anthony V. S. England; To Rao Coca; William Steinberg

(57) ABSTRACT

An e-mail is received for a first user's e-mailbox that increases accumulated storage volume of e-mails beyond a capacity limit. Available storage space indications are accessed for e-mailboxes of other users designated as overflow e-mailboxes. Overflow e-mailbox designation indicates agreement by a user to loan at least a portion of their e-mailbox. Responsive to indicated availability of storage space therein and cost of access, one of the overflow e-mailboxes is selected and a pointer thereto is stored for the first user pointing to the overflow e-mailbox. Thus, space in the first user's e-mailbox is reduced by using a loaned portion of storage space in the overflow e-mailbox in lieu of space in the first user's e-mailbox. Users may receive credit for loaning or be charged for using overflow e-mailbox space. E-mailboxes may be polled for space availability, so e-mail may be transferred from overflow e-mailboxes to the first user's e-mailbox.

20 Claims, 8 Drawing Sheets

METHOD, APPARATUS, AND COMPUTER PROGRAM PRODUCT FOR LENDING E-MAIL SPACE

CROSS REFERENCE TO RELATED APPLICATION

This is a continuation-in-part of application Ser. No. 11/593,849, filed Nov. 7, 2006 which is hereby incorporated herein by reference.

FIELD OF THE INVENTION

The present invention relates generally to controlling storage of electronic mail ("e-mail"), with particular emphasis on issues about storage space at a user's mailbox (also referred to herein as an "e-mailbox").

BACKGROUND

Today in spite of the fact that resources (like CPU power and disk space) are cheaper than before, increasing e-mail usage and the unpredictability associated with its size and volume can be very costly to individuals and corporations alike. E-mail is now a very commonly used way of sending and receiving information. E-mail may be sent between users on a local area network or a wide area network across the Internet for example. E-mail usage continues to increase, and it is not uncommon for an e-mail user to receive many hundreds of messages in a day. Many of these messages may themselves have lengthy attachments, which need a great deal of storage space, such as graphics files. In addition, there is growth in volume of spam e-mail which is unsolicited (predominantly unwanted) e-mail, and which also serves to fill up an e-mailbox. When an e-mailbox runs out of user space to store incoming e-mail, existing e-mail systems simply then bounce the e-mail back to the sender indicating that this e-mail was not delivered. Ordinarily, the receiver is not notified that an e-mail delivery failed. Thus, an important e-mail could be missed, and the receiver does not know this. This could have potentially disastrous consequences in business for example. In cases where the e-mail sent is large in size (perhaps due to attachments) the e-mail software does not deliver e-mail if the user space available is less than the e-mail size even if the amount of user space available is substantial.

SUMMARY

The present invention addresses the foregoing problems. In one form of the invention, a method for storing e-mail for a first user includes storing at least one capacity limit for the first user's e-mailbox and receiving an e-mail that increases accumulated storage volume of e-mails in the first user's e-mailbox beyond the at least one capacity limit. Indications are accessed of available storage space for e-mailboxes of other users that are designated as overflow e-mailboxes. Overflow e-mailbox designation indicates agreement by a user of such an overflow e-mailbox to loan at least a portion of the e-mailbox.

Responsive to indicated availability of storage space therein, one of the overflow e-mailboxes, which is an e-mailbox of a second user, is selected. Responsive to the selection, a pointer thereto is stored for the first user. That is, the pointer points to the selected second user's e-mailbox. Thus, space in the first user's e-mailbox is reduced by using a loaned portion of storage space in the second user's e-mailbox for the received e-mail in lieu of space in the first user's e-mailbox.

In another aspect, information of a first user stored in space borrowed by a second user is stored with due privacy and security considerations.

In another aspect, the overflow e-mailboxes have respective capacity limits and the users of the overflow e-mailboxes assign as quotas predetermined amounts of their e-mailbox capacity limits for use as the overflow portions of their e-mailboxes. Accessing the indications of available storage space may include determining availability of storage space in the respective overflow e-mailboxes relative to respective overflow e-mailbox capacity limits and overflow quotas.

In another aspect of the invention, if the received e-mail indicates both the first and the second user as recipients, at least a portion of the received e-mail is directed to storage in the second user's e-mailbox instead of storing the received e-mail in the first user's e-mailbox.

In another aspect, an overflow e-mailbox such as the one selected includes an overflow portion designated for loan and a user portion designated as not for loan. If the received e-mail does not include both the first and the second user as recipients, the directing of the at least portion of the received e-mail to storage includes directing the at least a portion of the received e-mail to storage in the overflow portion of the second user's e-mailbox, instead of storing the received e-mail in the first user's e-mailbox.

In another aspect, costs are stored for accessing the respective overflow e-mailboxes. The costs provide a ranking from a least costly to a most costly one of the overflow e-mailboxes and the selecting of the second user's e-mailbox is responsive to the cost ranking.

In another aspect, the overflow e-mailbox costs are computed responsive to i) capacities of the respective overflow e-mailboxes and ii) network logical distances between a server of the first user's e-mailbox and servers of the respective overflow e-mailboxes.

In another aspect, at least upon e-mail being stored for the first user on the second user's e-mailbox, polling begins of the first user's e-mailbox for detecting availability of space in the first user's e-mailbox. Responsive to a result of the polling, e-mail is moved to the first user's e-mailbox and removed from the second user's e-mailbox.

In another aspect, credit is granted to the second user for storing the first user's e-mail, wherein the storage credit is responsive to storage space used and time the first user's e-mail is stored in the second user's e-mailbox. If the first and second e-mailboxes are hosted by respective first and second e-mail service providers, this may include posting a credit to the second e-mail service provider and a debit to the first e-mail service provider for the using of the loaned portion.

In another aspect, the received e-mail is split into segments and at least a second one of the overflow e-mailboxes is selected responsive to indicated availability of storage space therein, wherein the second selected overflow e-mailbox is an e-mailbox of a third user. The respective segments are directed for storing in the respective second and third users' e-mailboxes instead of in the first user's e-mailbox.

Other variations, objects, advantages, and forms of the invention will become apparent upon reading the following detailed description and upon reference to the accompanying drawings.

DETAILED DESCRIPTION OF PREFERRED EMBODIMENTS OF THE INVENTION

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter or scope of claims in any way.

Figure 1A:
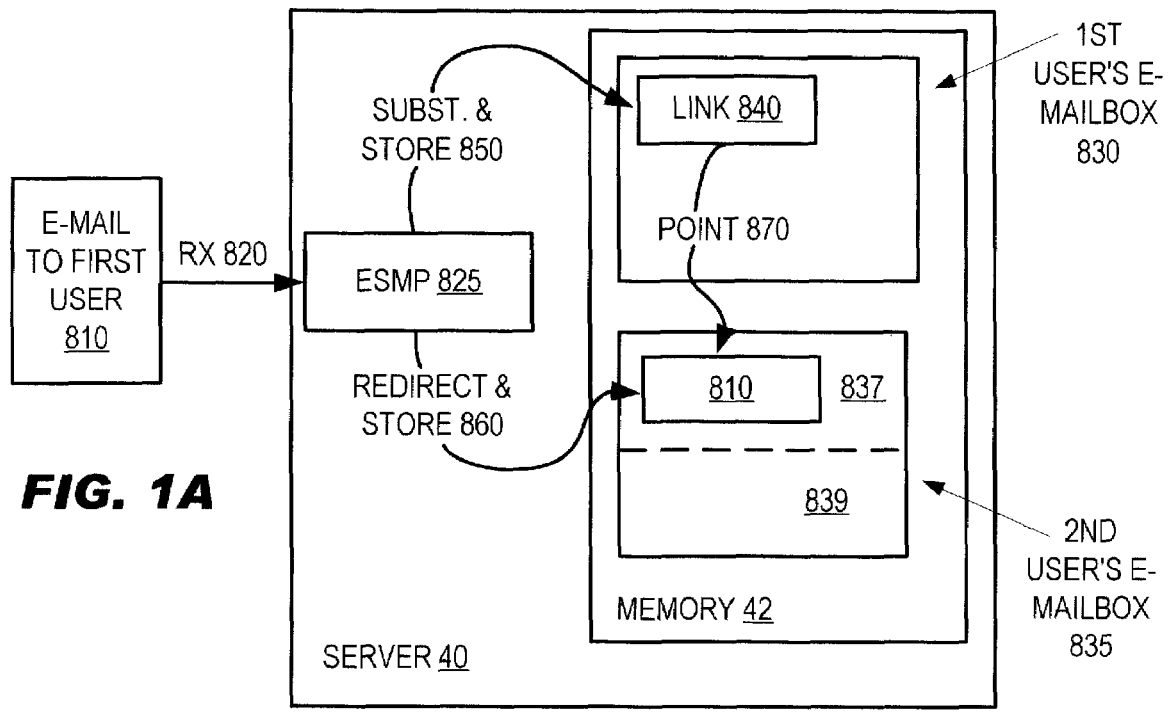
FIG. 1A illustrates certain aspects of an overflow e-mailbox arrangement, according to an embodiment of the present invention.
Figure 1B:
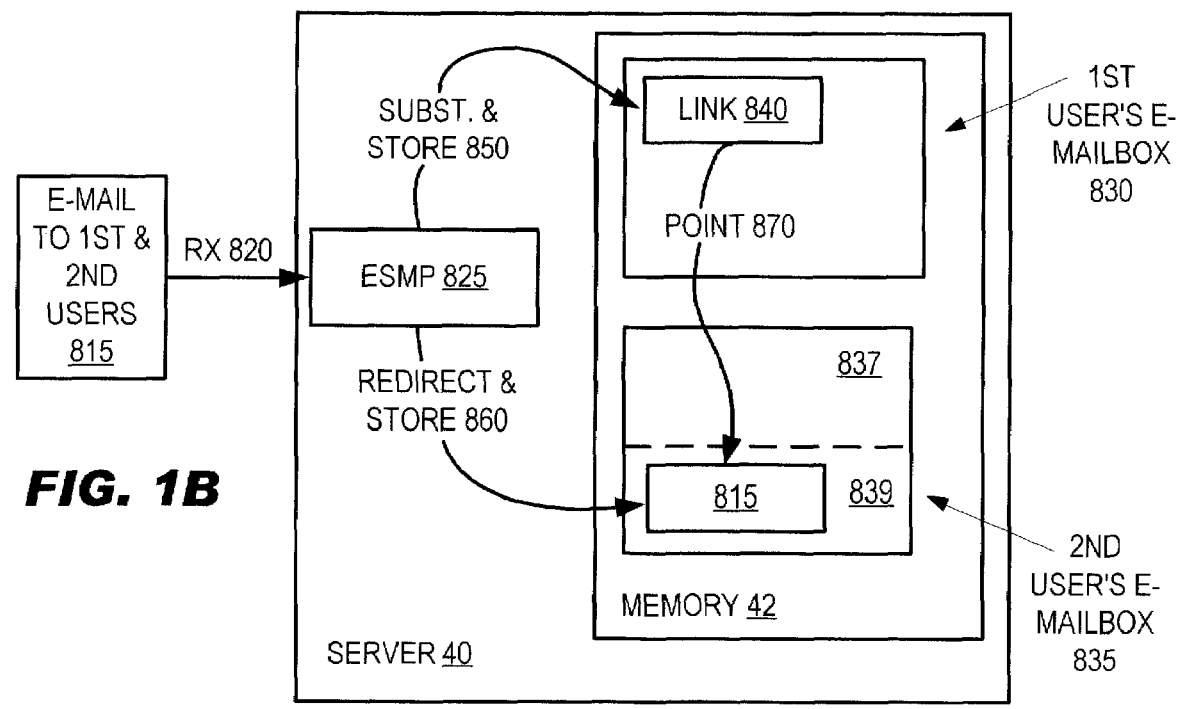
FIG. 1B illustrates additional aspects of an overflow e-mailbox arrangement, according to an embodiment of the present invention.
Figure 1C:
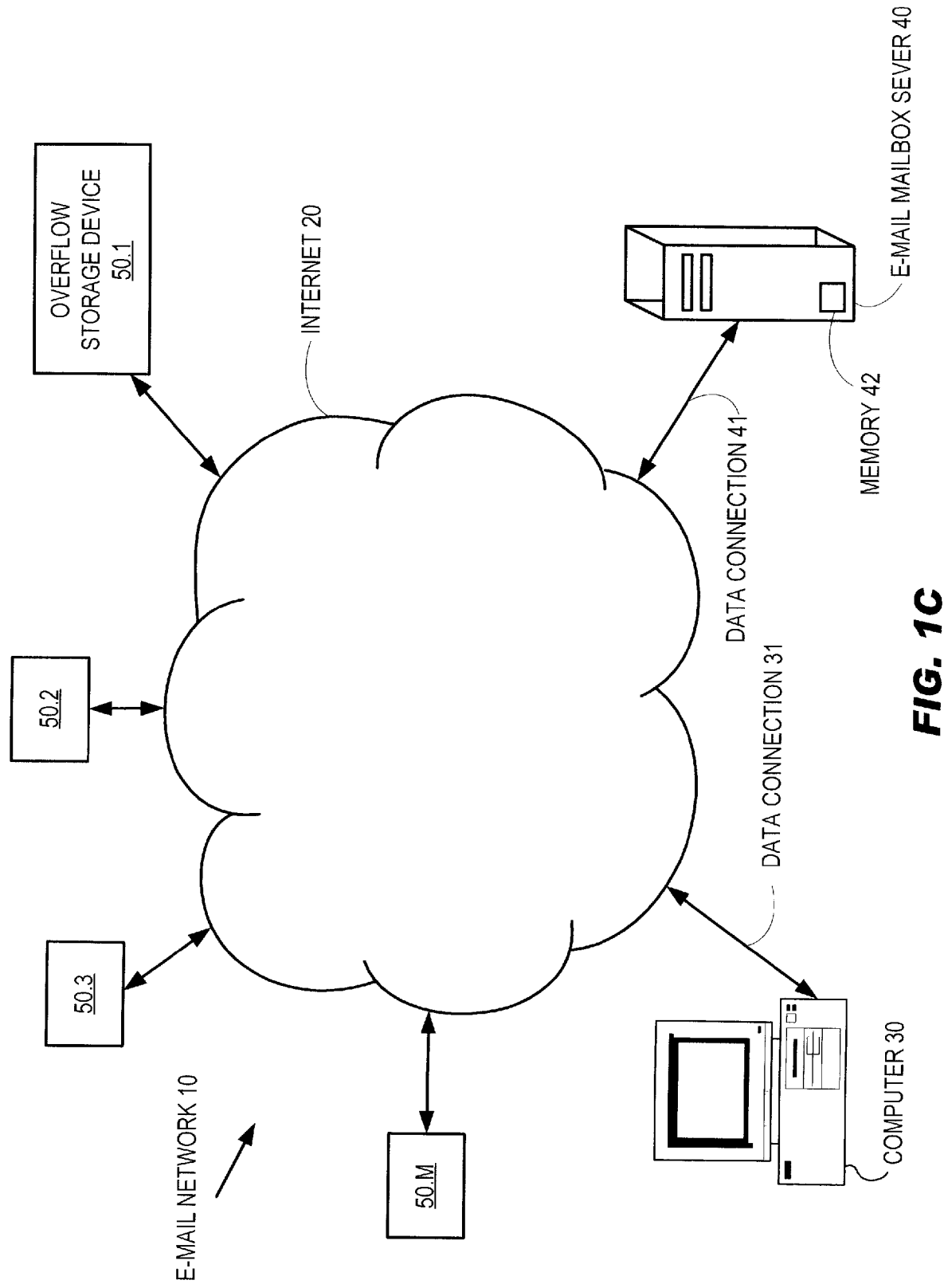
FIG. 1C illustrates a computer e-mail network, according to an embodiment of the present invention.

Referring now to FIG. 1C, computer e-mail network 10 includes a client computer 30 in communication with an e-mailbox server 40 over the Internet 20 via data connections 31 and 41. Data connection 31 may be a dial-up connection or a permanent ('always-on') connection. While network 10 in the illustrated embodiment includes the Internet 20, it does not necessarily have to.

An e-mail storage manager program (ESMP) runs on server 40. It should be understood, that actions attributed herein to server 40 are, generally speaking, actions performed by one or more processes of the ESMP. Also, while the description herein refers to an e-mailbox provided at a server, the invention is equally applicable to a local e-mailbox and software at a users PC, PDA, other computer, or even on a mobile telephone or other terminal.

E-mail server 40 generally allocates a maximum amount of memory 42 (local maximum capacity threshold) for e-mailboxes of respective users. Once a connection to an ISP is established, the user (not shown) at computer 30 can request access via data connection 41, Internet 20 and data connection 31 to e-mail messages currently stored in their e-mailbox (not shown) in memory 42, which may include downloading the messages to computer 30.

Downloaded messages received at computer 30 are decoded in a conventional manner by a client e-mail program, which may be a proprietary program, such as Microsoft Outlook or Lotus Notes, or an open source program, such as Mozilla Thunderbird. In a preferred method, the e-mailbox is continuously and dynamically assessed to determine the level of user e-mailbox storage space remaining within server 40. This level is checked by server 40 from time to time and is represented by an updated level indicator stored in memory 42 in server 40. Advantageously, the user can pre-set various capacity threshold levels that are also stored in the memory in server 40. Alternatively, these levels can be set by server 40, or by the ISP, or otherwise. These pre-set threshold levels determine which of the processing steps as shown in the flowchart of FIG. 2 are executed, and are chosen to meet the user's requirements.

Figure 2:
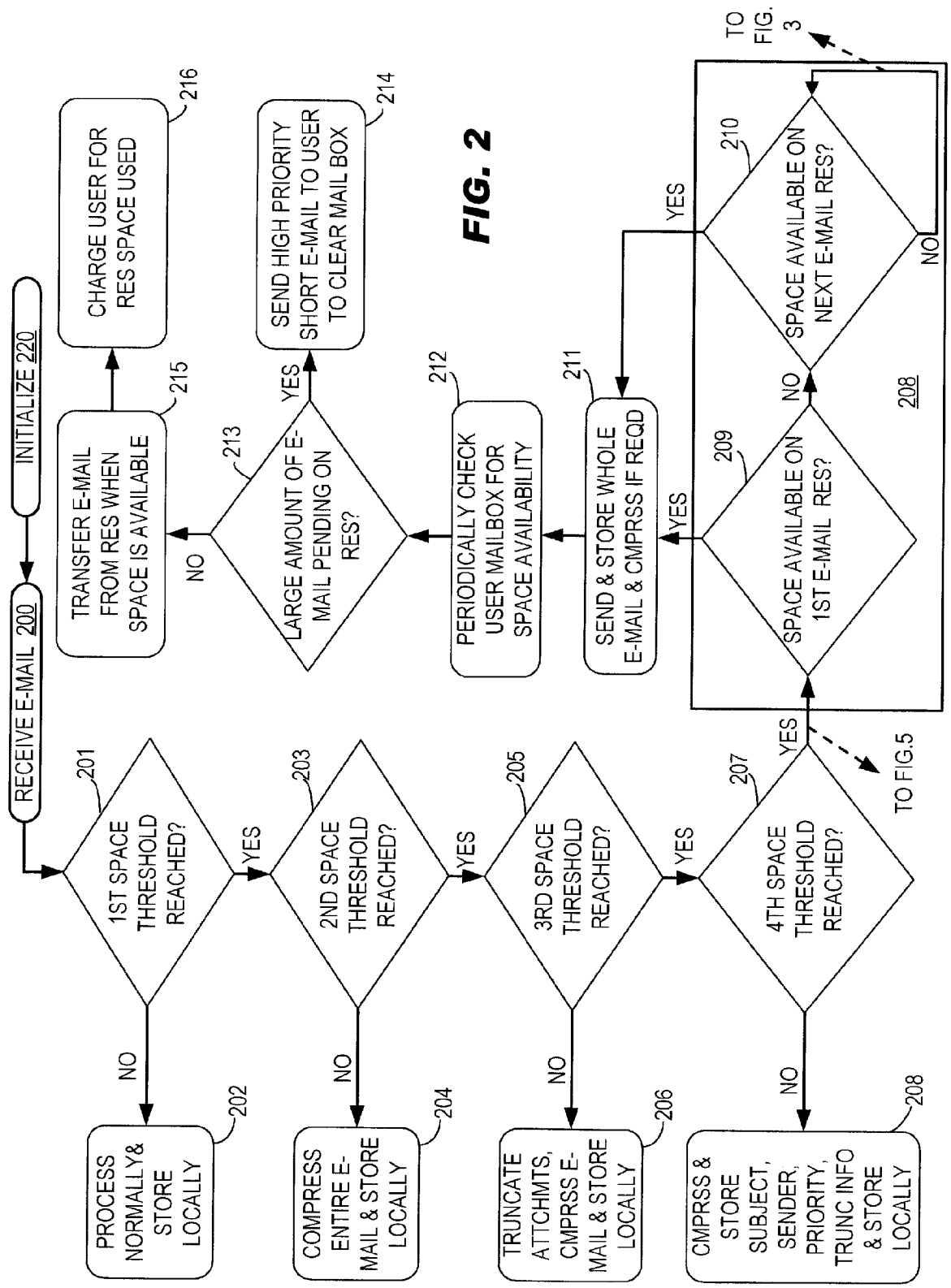
FIG. 2 illustrates a method of controlling storage for an e-mailbox, according to an embodiment of the present invention.

Referring now to FIG. 2 in connection with FIG. 1, in an embodiment of the present invention received e-mails are individually "sprayed," i.e., distributed among e-mail reservoirs 50.1, 50.2, 50.3, etc., through 50.N (also referred to herein as "e-mail reservoirs"), e.g., storage servers, on network 10, wherein for a received e-mail message one of the storage devices 50.1, 50.2, 50.3, etc. is selected for storage of the e-mail based on cost of transfer and/or capacity of the recipient e-mail reservoir.

More specifically, server 40 initially receives 200 an e-mail message for a user and then compares a current level indicator, which indicates the amount of e-mail storage space currently in use, to a first threshold level pre-set by the user. The threshold level is, for example, a proportion of the total available e-mailbox space allocated to that user on server 40. If the first threshold has not been exceeded, then server 40 locally stores 202 the full incoming e-mail message in e-mailbox of memory 42, and any attachments, in a conventional manner. If, however, the threshold has been reached or exceeded, then server 40 compares 203 the current level indicator with a second threshold level.

If the second threshold has not been exceeded, server 40 compresses 204 the incoming e-mail, including any attachments, using a known data compression program, for example a zip type program, and the compressed version is stored in the e-mailbox for future retrieval. In circumstances where the second threshold has been exceeded, server 40 compares 205 the level indicator with a third threshold level.

When the first and the second, but not the third, thresholds have been exceeded, server 40 compresses and stores 206 in e-mailbox of memory 42 only the message portion of the e-mail. Any attachments are returned to the sender in the conventional manner. If the third threshold has been exceeded, server 40 compares 207 the level indicator with a fourth threshold level.

If the fourth threshold has not been exceeded, in addition to truncation of attachments, the body contents of the e-mail are truncated 208 and only data concerning the e-mail is stored in e-mailbox of memory 42. This data may comprise, for example, information regarding the sender, path taken by the message, date/time, subject, priority, number of attachments, and/or number of bytes of body content that was truncated.

Also according to the illustrated features, e-mail server 40 is initialised 220 with a stored data structure that indicates addresses for e-mail reservoirs 50.1, 50.2, 50.3, etc., through 50.N. This initialisation 220 may be by an administrator or a user, or may be performed automatically by e-mail server 40 in connection with automatically discovering such storage devices 50.1, 50.2, etc., on network 10 according to a predetermined protocol. Likewise, costs associated with accessing respective e-mail reservoirs 50.1, 50.2, etc. from a user e-mailbox on server 40 are initialised 220 and stored as a data structure in memory 42 of e-mail server 40. Initialisation 220 of these costs may also be performed by an administrator or a user or automatically by e-mail server 40. This may include server 40 polling storage devices 50.1, 50.2, etc. to determine network logical distances between local server 40 and respective remote e-mail reservoirs 50.1, 50.2, etc. and computing costs as a function of those logical distances. It may also include server 40 polling storage devices 50.1, 50.2, etc. to determine their respective storage capacities (total or currently available) and computing costs as a function of those capacities. Server 40 may compute costs as a function of both the capacities and the distances, and may also include other factors in the computation. (Although FIG. 2 indicates and the above describes these processes as initialisation 220, it should be understood that this may include updating the number and addresses of e-mail reservoirs 50.1, 50.2, 50.3, etc., and the costs associated with the respective e-mail reservoirs 50.1, 50.2, 50.3, etc.)

An exemplary matrix cost data structure is illustrated in Table One below, in which rows represent respective users $u_1$, $u_2, \ldots, u_n$ and columns represent respective e-mail reservoirs $e_1, e_2, \ldots, e_m$ in network 10. Accordingly, each cell of the matrix, which is indexed by a row and column, indicates a cost of accessing the e-mail reservoir of that cell's column from that e-mailbox. Of course, for a single server 40, the matrix has only a single row $u_1$.

TABLE ONE

|       | $e_1$    | $e_2$    | $e_3$    | $e_m$    |
|-------|----------|----------|----------|----------|
| $u_1$ | $c_{11}$ | $c_{21}$ | $c_{31}$ | $c_{1m}$ |
| $u_2$ | $c_{21}$ | $c_{22}$ | $c_{23}$ | $c_{2m}$ |
| $u_3$ | $c_{31}$ | $c_{32}$ | $c_{33}$ | $c_{3m}$ |
| $u_n$ | $c_{n1}$ | $c_{n2}$ | $c_{n3}$ | $c_{nm}$ |

When space is available on either the first or next e-mail reservoir, server 40 stores the e-mail in the available e-mail reservoir using standard compression if necessary and/or opted for (211). Server 40 or e-mail reservoir polls the e-mailbox sequentially and periodically to check for availability of space (212). If the amount of a user's e-mail stored on an e-mail reservoir exceeds a certain predetermined threshold, e-mail reservoir notifies server 40 that large e-mail size/volume is pending to be downloaded and server 40 prompts the user (213). When space is available, server 40 moves e-mail to the user's local e-mailbox and removes it from the e-mail reservoir (214). Where necessary and/or opted for server 40 charges users additionally for the amount of time/space that he/she may end up using the e-mail reservoir e-mail space (215). Privacy and Security of e-mails in such a set-up is well taken care of using the standard privacy and security measures that are available for e-mail servers. Standard encryption techniques are used to ensure security.

Overflow e-mailboxes

In other features partly illustrated in FIGS. 1A and 1B, responsive to a first user receiving an e-mail that exceed that user's local e-mailbox storage space (local maximum capacity threshold), storage space for the e-mail is temporarily borrowed from one or more other users who have designated their e-mailboxes for overflow use.

Note that in the various embodiment described in this connection, an e-mail of a first user stored in a second user's e-mailbox for overflow purposes cannot be read by the second user due to privacy and security considerations. Only the second user's e-mailbox storage space is being used. Privacy and security of e-mails is ensured using standard privacy and security measures available for e-mail servers and standard encryption techniques, including encryption and hiding. Since the user has pre-approved use of his/her e-mailbox space or disk space, there is no anticipated attempt to hack or harm data. However, various levels of encryption are available with current technology. The first user's e-mail and information about the first user is hidden from the second user in one embodiment using the well known OTOH method. In another feature, the ESMP of e-mail server that supports overflow e-mailboxes includes a process that monitors the e-mails stored as overflow e-mail, i.e., in a designated overflow portion of an e-mailbox, and identifies and records any attempts to read, access, or modify e-mails or information about such e-mails. These privacy and security features may apply to all the embodiments described herein.

Overflow e-mailbox users may specify respective capacity limits (overflow e-mailbox quotas) indicating how much of their storage space may be loaned to other users. This may include particular user quotas for space loanable to particular other users and an overall quota for space loanable to all users combined. As previously described, e-mailboxes in general have various capacity thresholds including maximum total capacity. These may, of course, also apply to overflow e-mailboxes.

Note that in various embodiment described herein, the first and second user may not be serviced by the same ESMP. Conversely, in various embodiment described herein, the first and second user may not be serviced by the same ESMP. Indeed, in one embodiment, a user can only designate an e-mailbox as an overflow e-mailbox for e-mail users on the same server. However, in embodiments described herein a user can only designate an e-mailbox as an overflow e-mailbox for e-mail users on a predetermined group of servers, such as a group of servers serving a network domain the users share in common, or at least hosted by an e-mail service provider they share in common. Moreover, in suitable ones of the embodiments described herein there may be no such limits on which e-mailboxes may be designated to be loaned for which users.

Referring now in particular to FIG. 1A, certain structural and functional details of some of the above features are illustrated according to an embodiment of the present invention. Illustrated is an e-mailbox 830 of a first user and an e-mailbox 835 of a second user. E-mailbox 835 is designated as an overflow e-mailbox. Overflow e-mailbox designation for e-mailbox 835 indicates agreement by the second user to loan at least a portion of e-mailbox 835. (In the embodiment, it is preferred that other such overflow e-mailboxes also exist. But only one is shown in order to make the explanation herein easier to follow.)

Server 40 receives an e-mail 810 for a first user's e-mailbox 830. E-mail storage management program 825 of server 40 detects that e-mail 810 increases accumulated storage volume of e-mails in the first user's e-mailbox beyond a predesignated capacity limit, i.e., a limit that has previously been stored and that ESMP can access from storage. ESMP 825 accesses indications of available storage space for e-mailboxes of other users that are designated as overflow e-mailboxes. This may involve ESMP 825 accessing the overflow e-mailboxes to determine space utilization therein, respective limits that have been set for them, and computing availability, or it may involve ESMP 825 accessing results of similar computations performed by respective overflow e-mailbox programs themselves (not shown). Responsive to indicated availability of storage space in e-mailbox 835, for example, ESMP 825 selects e-mailbox 835.

Note also, costs may be stored for accessing the respective overflow e-mailboxes. For example, the costs may provide a ranking from a least costly to a most costly one of the overflow e-mailboxes. Accordingly, the selecting of e-mailbox 835 may be responsive to the cost ranking. In another aspect, the overflow e-mailbox costs are computed responsive to i) capacities of the respective overflow e-mailboxes and ii) network logical distances between a server of the first user's e-mailbox and servers of the respective overflow e-mailboxes.

Responsive to the selection of e-mailbox 835, ESMP 825 substitutes and stores 850 a pointer for the first user, such as link 840, which is illustrated as being stored in the user's e-mailbox 830. The pointer, e.g., link 840, points 870 to selected second user's e-mailbox 835. Space in the first user's e-mailbox 830 is reduced by ESMP 825 redirecting and storing 860 at least a portion of e-mail 810 in e-mailbox 835 instead of e-mailbox 830, thus using a loaned portion of storage space in e-mailbox 835 for e-mail 810 in lieu of space in e-mailbox 830. FIGS. 1A and 1B, illustrate storing the whole e-mail 810 in e-mailbox 835, but it should be understood that only part of e-mail 810 may be stored there, as will be described in further detail herein below.

The overflow e-mailboxes (only one of which is illustrated in FIG. 1A) have respective capacity limits and the users of the overflow e-mailboxes assign as quotas predetermined amounts of their e-mailbox capacity limits for use as the overflow portions of their e-mailboxes. Accessing the indications of available storage space may include ESMP 825 determining availability of storage space in the respective overflow e-mailboxes relative to respective overflow e-mailbox capacity limits and overflow quotas.

In the embodiment illustrated in FIG. 1A, each overflow e-mailbox, such as e-mailbox 835, includes an overflow portion 837 designated for loan and a user portion 839 designated as not for loan. ESMP 825 or some program feature added to a conventional e-mail user's tool may provide a configuration setting program instructions for a process to prompt the user to set up these portions 837 and 839. According to this process, the amount of storage space allocated to each portion may be set automatically, i.e., by default, or by user selection.

If, as in FIG. 1A, the received e-mail 810 does not include both the first and the second user as recipients, the directing of the at least portion of received e-mail 810 to storage includes directing the at least a portion of the received e-mail to storage in the overflow portion 837 of the second user's e-mailbox 835, as shown in FIG. 1A, i.e., instead of storing the at least portion of 810 in e-mailbox 830. If, however, a received e-mail indicates both the first and the second user as recipients, as in email 815 of FIG. 1B, ESMP 825 redirects and stores 860 received e-mail 815, or allows it to be redirected and stored, as is conventional, in the second user's e-mailbox 835, i.e., as a copy for the second user. In this situation, ESMP 825 takes advantage of the fact that e-mail indicates both the first and the second user as recipients and substitutes and stores 850 a pointer, e.g., link 840, in the first user's e-mailbox 830 pointing 870 to the copy of e-mail 815 stored in e-mailbox 835, i.e., instead of also storing the received e-mail 815 in e-mailbox 830.

In the situation illustrated in FIG. 1B, e-mail 815 may be stored in user portion 839 of e-mailbox 835, even though e-mail 815 is being used for the first user, since e-mail 815 is also being used for the second user. Note that this may be the case in this situation even if the second user does not designate a portion of e-mailbox 835 for loan as an overflow portion 839. However, in FIG. 1B, e-mailbox 835 does have both portions 837 and 839 designated, so an overflow copy of e-mail 815 may optionally be stored for e-mailbox 830 in overflow portion 837 of e-mailbox 835, space permitting.

In another aspect, at least upon an e-mail such as 810 or 815 being stored for the first user in an overflow portion 837 of second user's e-mailbox 835, polling begins of e-mailbox 830 for detecting the development of availability of space therein, i.e. since e-mail may be deleted from e-mailbox 830. Responsive to a result of the polling, e.g., accumulated e-mail in e-mailbox 830 falling below some predesignated limit, e-mail 810 or 815 is moved to the first user's e-mailbox and removed from the overflow portion 837 of second user's e-mailbox 835. (Note also, that if e-mail 815 is stored in user portion 839 of e-mailbox 835, then if the second user deletes e-mail 815, the e-mail tool (not shown) for e-mailbox 835 may notify ESMP 825 and ESMP may direct e-mail to storage in overflow portion 837 of e-mailbox 835, space permitting.)

In another aspect, credit is granted to the second user for storing the first user's e-mail 810 or even 815, wherein the storage credit is responsive to storage space used and time the first user's e-mail 810 or 815 is stored in the second user's e-mailbox 835. If e-mailboxes 830 and 835 are hosted by respective first and second e-mail service providers, this may include posting a credit to the second e-mail service provider and a debit to the first e-mail service provider for the using of the loaned portion.

In another aspect, ESMP 825 may split the received e-mail 810 or 815 into segments and at least a second one of the overflow e-mailboxes (not shown) may be selected responsive to indicated availability of storage space therein, wherein the second selected overflow e-mailbox is an e-mailbox of a third user. The ESMP 825 may then direct the respective segments for storing in the respective second and third users' e-mailboxes instead of in the first user's e-mailbox.

Figure 4:
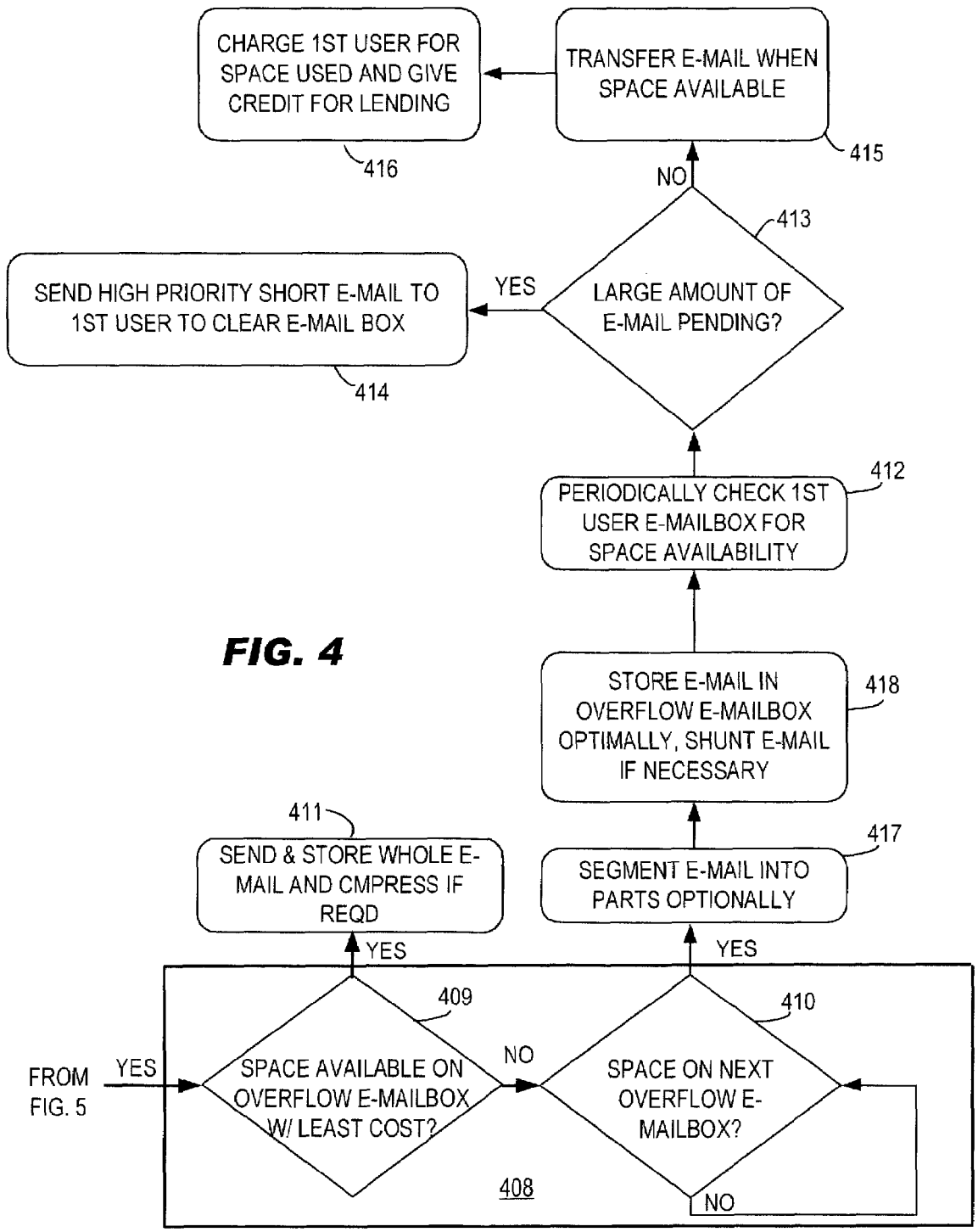
FIG. 4 illustrates a method of controlling storage for an e-mailbox where space is borrowed from overflow e-mailboxes, according to an embodiment of the present invention.

Aspects of an embodiment are illustrated, process-wise, in FIG. 4 in connection with FIGS. 1 and 2. E-mail server 40 is initialised 220 with a stored data structure that indicates addresses for overflow e-mailboxes. This initialisation 220 may be by an administrator or a user, or may be performed automatically by e-mail server 40 automatically scanning network 10 to discover such storage devices, according to a predetermined protocol.

Costs associated with accessing respective overflow e-mailboxes from a user e-mailbox on server 40 are initialised 220 and stored as a data structure in memory 42 of e-mail server 40. Initialisation 220 of these costs may be performed by an administrator or a user or automatically by e-mail server 40. This may include server 40 polling overflow e-mailboxes to determine network logical distances between local server 40 and respective overflow e-mailboxes and computing costs as a function of those logical distances. It may also include server 40 polling overflow e-mailboxes to determine their respective storage capacities (total or currently available) and computing costs as a function of those capacities. Server 40 may compute costs as a function of both the capacities and the distances, and may also include other factors in the computation. (Although FIG. 2 indicates and the above describes these processes as initialisation 220, it should be understood that this may include updating the number and addresses of overflow e-mailboxes and the costs associated with the respective overflow e-mailboxes.)

The previously described overflow e-mailbox user quotas are also initialised 220 and stored as a data structure in memory 42 of e-mail server 40 either by users or an administrator or the ESMP setting default quotas.

An exemplary matrix cost data structure is illustrated in Table Two below, in which rows and columns represent respective users $u_1, u_2, \ldots, u_n$ in network 10. Accordingly, each cell of the matrix, which is indexed by a row and column, indicates a cost of accessing the overflow e-mailboxes of that cell's column from that e-mailbox. Let $m_1, m_2, \ldots, m_k$ be the e-mails received by a user $u_1$. Then the ESMP stores the cost of transfer from the various user e-mailboxes to the overflow e-mailboxes. The following cost matrix gives the cost of transferring unit e-mail from/to any e-mailbox to/from any e-mailbox.

TABLE TWO

|  | $u_1$ | $u_2$ | $u_3$ |  | $u_m$ |
|---|---|---|---|---|---|
| $u_1$ | 0 | $c_{21}$ | $c_{31}$ |  | $c_{1m}$ |
| $u_2$ | $c_{21}$ | 0 | $c_{23}$ |  | $c_{2m}$ |
| $u_3$ | $c_{31}$ | $c_{32}$ | 0 |  | $c_{3m}$ |
|  |  |  |  | 0 |  |
| $u_n$ | $c_{n1}$ | $c_{n2}$ | $c_{n3}$ |  | 0 |

In this case $c_{ij}=C_{ji}$

The cost factors are a function of the overflow e-mailbox capacity and network logical distance between the e-mailbox servers. The ESMP uses this matrix to move a user's e-mail to the least costly overflow e-mailbox.

To summarize the above, the ESMP has access to a list of addresses for predesignated overflow e-mailboxes for every user who can receive e-mail from the network when a user does not have local storage space available. Likewise, the ESMP has access to costs for transferring e-mails between an overflow e-mailbox and a user's local e-mailbox. The ESMP assigns a unique id to identify each e-mail, or portion thereof. When a first user's local e-mailbox cannot accommodate an e-mail, as previously described, the ESMP checks to see if space is available on the overflow e-mailbox with the least cost of transfer (409) and, if so, selects that e-mailbox and directs the e-mail to be stored there, i.e., stores the e-mail there directly or sends it via the network for storage there (411). This may include using standard compression, if necessary and/or opted for. If space is not available on the first overflow e-mailbox, the ESMP checks for availability of space on the next overflow e-mailbox with the least cost of transfer (410) and, if space is available at the next one, stores the e-mail there, again using standard compression, if necessary and/or opted for (418).

If (418) the total amount of e-mail stored in the overflow portion of an overflow e-mailbox that is loaned to other users exceeds a total predetermined overflow quota, or if the amount of used storage space that is loaned to a particular other user in that overflow portion exceeds a predetermined overflow quota designated for that particular other user, or if the total amount of e-mail stored on the overflow e-mailbox, including the e-mail of the e-mailbox's own user, exceeds some predesignated overall capacity limit, then the ESMP removes (shunts) e-mails from the overflow e-mailbox and sends them to the next overflow e-mailbox with the least cost of transfer. Thus, the ESMP shunts e-mail from one overflow e-mailbox to another until enough storage space is found. In the event that no overflow e-mailbox is available for overflow storage, the ESMP bounces back the unaccommodated e-mail. The ESMP tracks the shunting of the sprayed e-mail from overflow e-mailbox to another until it reaches the user it is meant for. The ESMP assigns a unique id to each e-mail sent to an overflow e-mailbox to facilitate this tracking and communication.

Once an e-mail has been stored in an overflow e-mailbox, the ESMP polls the first user's e-mailbox automatically from time to time or on demand to check for availability of space (412). (The e-mailboxes may be checked in a predetermined sequence.) If storage space is found in the first user's e-mailbox, the ESMP automatically transfers the e-mail to the first user's e-mailbox. If the amount of a first user's e-mail stored on a second user's e-mailbox used for overflow exceeds a certain predetermined quota for the first user, or the total amount of overflow e-mail stored thereon exceeds an overall overflow quota, or if the total amount of all e-mail stored thereon exceeds an overall capacity limit, the second user's e-mailbox notifies the ESMP for the first user that an e-mail of a large size or a large volume of e-mail is pending to be downloaded, and the ESMP responsively prompts the user (steps 413 and 414). Otherwise, if the ESMP determines space has become available, server 40 initiates transfer of e-mail to the user's local e-mailbox and removal of the transferred e-mail from the overflow e-mailbox (415). Where necessary, and/or opted for, the ESMP grants the selected overflow e-mailbox's user credit or charges the first user for storing the first user's e-mail based on the time the first user's e-mail is stored and/or the storage space used for storing the first user's e-mail on the selected overflow e-mailbox (416).

Figure 5:
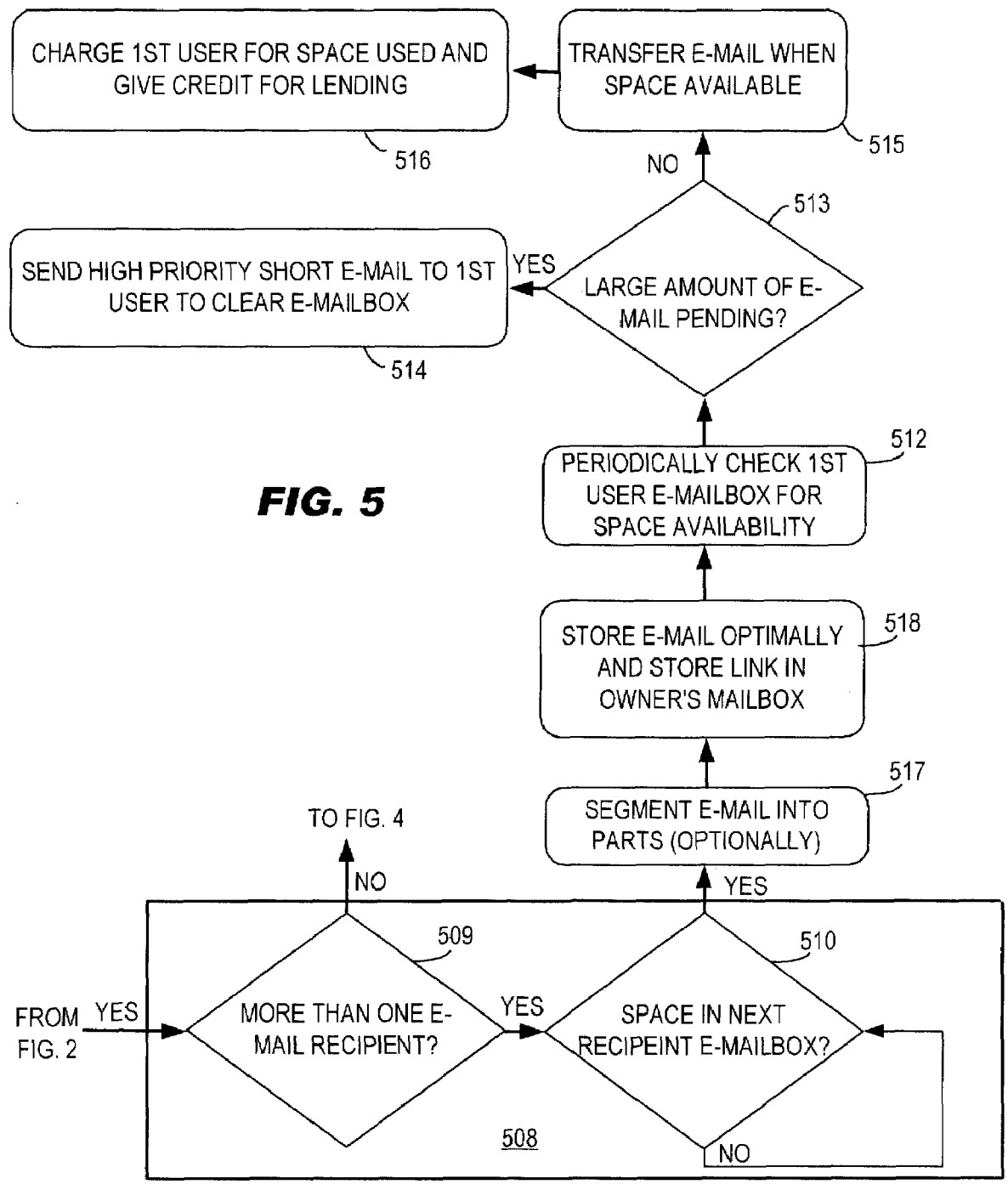
FIG. 5 illustrates a method of controlling storage for an e-mailbox, whereby only a link to e-mail is stored for users sharing storage space with the sender, according to an embodiment of the present invention.

FIG. 5, in connection with FIGS. 1 and 2, illustrates certain process related features of an embodiment of the invention that concern a situation in which a first user receives an e-mail that exceeds that user's local capacity threshold and the e-mail has a second recipient. E-mail server 40 is initialised 220 with a stored data structure that indicates addresses, transfer or storage costs, etc. for overflow e-mailboxes, as described herein above. The ESMP receives an e-mail for a first user as described earlier, then checks to see if the e-mail causes a certain capacity threshold of the first user's local e-mailbox to be exceeded or if the threshold is already currently exceeded. If yes, the ESMP parses the e-mail's header and checks to see if any other users are also designated in the e-mail as recipients (509). (This may include also checking to see if the e-mailbox of such an other recipient has been designated as an overflow e-mailbox, and may also include checking to see whether the e-mailbox address of such an other recipient has the same network domain or checking at least to see whether the other recipient is served by the same e-mail service provider as the first user.)

If yes, the ESMP checks for availability of space on e-mailboxes of the other recipients. This may include comparing used space to a user overflow quota, overall overflow quota, and total capacity limit. The ESMP then responsively selects from among the recipients a second user's e-mailbox with available space based on these comparisons and with the least cost of transfer (510), and stores a copy of the e-mail in the second user's e-mailbox, but not in the first user's e-mailbox (518). (This includes checking successive e-mailboxes, if necessary, to find one having available space.) In this case, the ESMP saves only a pointer link in the first user's local e-mailbox or other designated storage space (518), where the link points to the second user's copy of the e-mail in that recipient's e-mailbox storage space, and by which the first user call access the e-mail.

Once this is done, the ESMP polls the first user's e-mailbox to check for availability of space (512), and automatically stores a copy of the e-mail in the first users e-mailbox if the ESMP finds that space has become available. This is done the a manner described herein above, except that in this case the copy in the second user's e-mailbox is also for the second user, so the second user's copy is not be removed from the second user's e-mailbox, unless called for by the second user. In the event that the second user wants to delete his/her copy of the e-mail that is serving as an overflow copy for the first user, then the ESMP finds another user who is also a recipient and who still has a copy of the e-mail. If no other user who is also a recipient still has a copy of the e-mail, the ESMP for the second user bounces the e-mail back to the first user. In this case the ESMP for the first user may find an overflow mailbox as described above in connection with FIG. 4.

As described above, if the amount of a user's e-mail stored in an overflow e-mailbox exceeds a certain predetermined threshold, the ESMP notifies server 40 that large e-mail size/volume is pending to be downloaded, and server 40 prompts the user (steps 513 and 514).

Where necessary, and/or opted for, server 40 charges users for the amount of time/space that they may have used a recipient's e-mailbox space or credit the user if that user's local storage space has been used for storing e-mail of another recipient e-mail user (516).

Regarding the processes depicted in FIGS. 4 and 5, in the event that no space is available to store even a link in the first user's e-mailbox, the ESMP bounces the e-mail back to the sender.

In another feature of the above, if user e-mail space is running out, as determined in a fashion as previously described, the ESMP splits e-mails into segments and stores the segments in overflow e-mailboxes on the network. This may be done before or after some received e-mails are sprayed to overflow e-mailboxes on the network without splitting them into segments, as previously described.

Referring now to the exemplary matrix cost data structure of Table One, and considering the case where e-mail segments are stored, the cost to store multiple segments or an e-mail is calculated by multiplying the size of the e-mail segment with the cost factor and adding up the same for all segments. Let $m_1, m_2, \ldots, m_k$ be the e-mails received by a user $u_1$. Let $m_1$ be split into $m_{11}, m_{12}, m_{13}, \ldots m_{1i}$ and be stored in overflow e-mailboxes $e_1, e_2, \ldots, e_i$. Then cost of transferring $m_1$ into the e-mailbox would be.

$$C = c_{11}*m_{11} + c_{12}*m_{12} + \ldots + c_{1i}*m_{1i}$$

This is less than the cost of moving the whole e-mail from one overflow e-mailbox whose cost of transfer was higher than the rest.

That is:

$$C < C_k = c_{1k}*m_1 \text{ where } c_{1k} \text{ is greater than each of } c_{11}, c_{12}, \ldots c_{1i}$$

The ESMP select a least costly set of overflow e-mailboxes for storing segments of a user's e-mail responsive to the cost function calculated as set out above.

Figure 3:
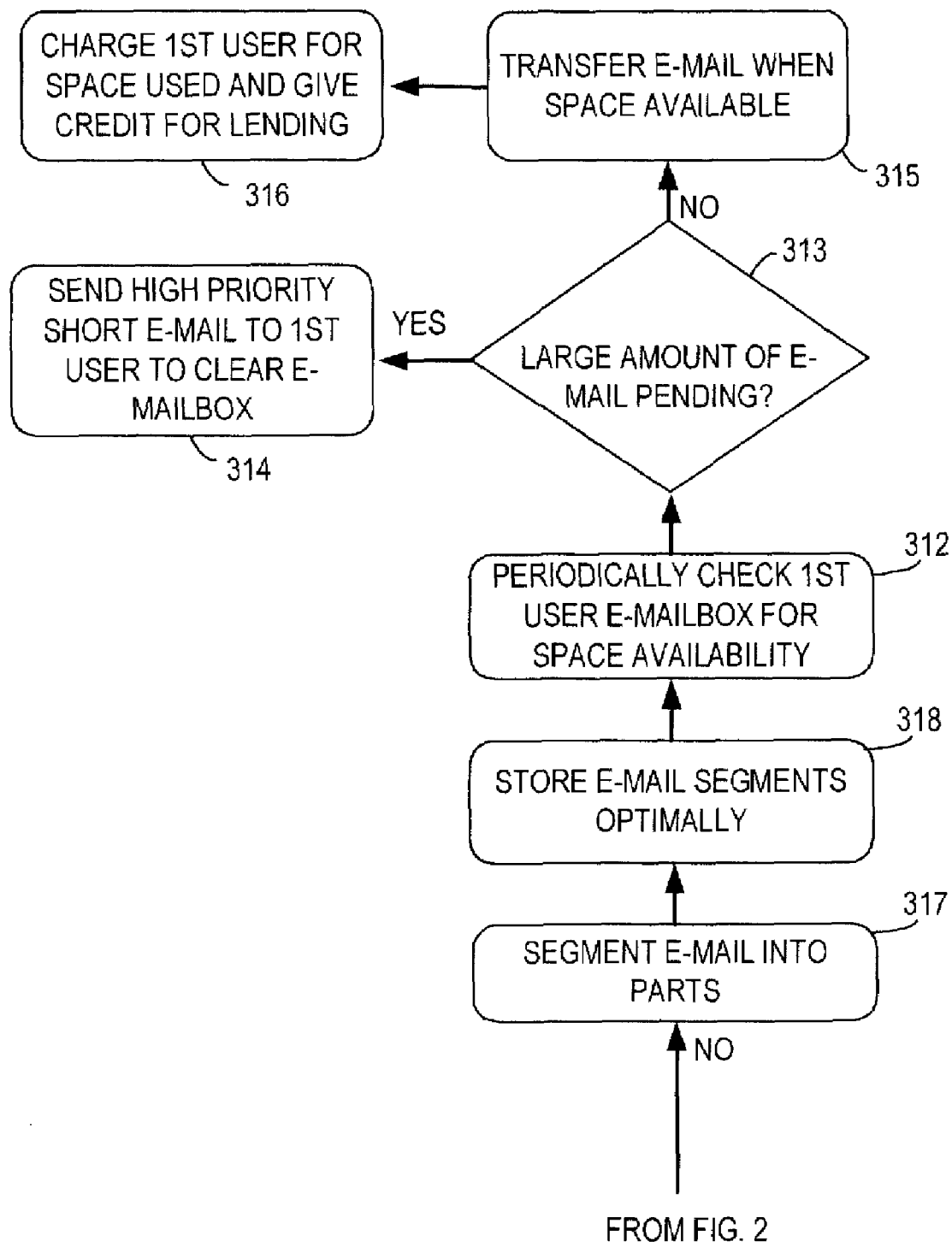
FIG. 3 illustrates a method of splitting e-mail into segments based on cost of transfer and/or capacity of the recipient e-mail reservoir, according to an embodiment of the present invention.

Referring now to FIG. 3 in connection with FIGS. 1 and 2, process aspects of these segment related features are illustrated. As shown, if the overflow e-mailboxes lack the required space, or if the user has exceeded a quota assigned within each overflow e-mailbox, or if the cost of transferring the whole e-mail is higher than the cost of transferring individual segments of the e-mail from various overflow e-mailboxes where the individual segments thereof are stored, the ESMP splits the e-mail and attachments, as required (317).

The ESMP assigns a respective, unique id's to identify the e-mail and its associated segments. A segment's unique id is structured such that its association with the unique e-mail identifier is also identified. The ESMP then stores the e-mail segments in the available overflow e-mailboxes (318). As previously mentioned, this may include using standard compression, if necessary and/or opted for (318). The ESMP has a facility to track what segments are archived in the e-mailbox and the overflow e-mailboxes.

Once this is done, the ESMP polls the first user's e-mailbox from time to time to check for availability of space (312). Optionally, the ESMP provides the user, upon request, information about segments of the e-mails available in overflow e-mailboxes. If the polling indicates space on the first user's e-mailbox has become available, the user's ESMP moves e-mail segments to the first user's local e-mailbox and removes them from the overflow e-mailboxes (314) based on availability and quota in such a way that the total cost of transferring the whole e-mail from the various overflow e-mailboxes to the local user e-mailbox is minimal. (The ESMP determines this total cost according to a function that includes multiplying cost factors and quotas or amounts of space available for each overflow e-mailbox (whichever is lower), adding up the products. Where necessary, or opted for, the ESMP charges users additionally for the accumulated amount of time they have used overflow e-mailboxes, or the amount of space they have used, or a combination of the two (316).)

Otherwise, if the amount of a first user's e-mail stored on a second user's e-mailbox used for overflow exceeds a certain predetermined quota for the first user, or the total amount of overflow e-mail stored thereon exceeds an overall overflow quota, or if the total amount of all e-mail stored thereon exceeds an overall capacity limit, the second user's e-mailbox notifies the ESMP for the first user that an e-mail of a large size or a large volume of e-mail is pending to be downloaded, and the ESMP responsively prompts the user (313).

Figure 6:
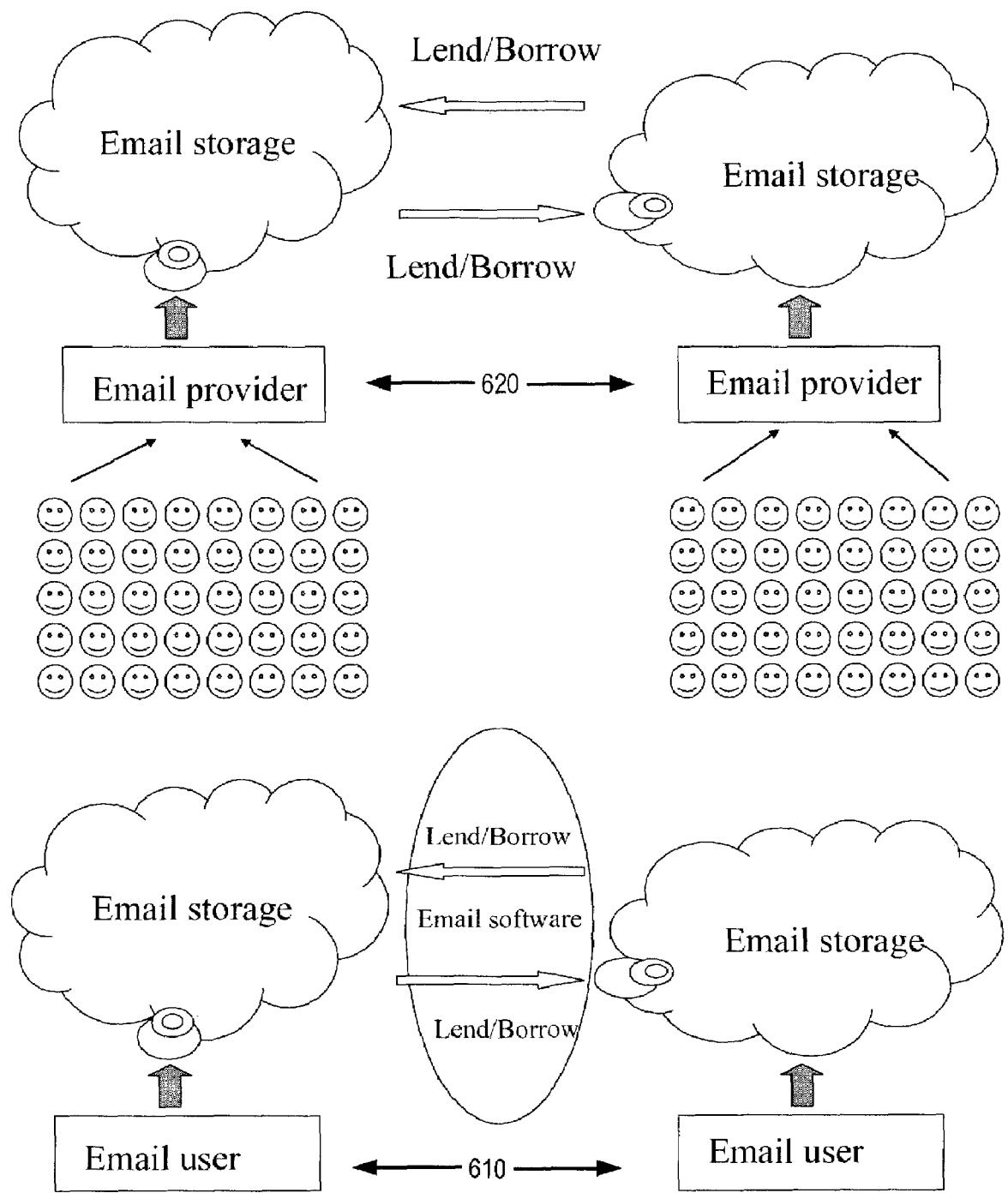
FIG. 6 illustrates a business method to lend and borrow e-mail storage space on a need basis, according to an embodiment of the present invention.
Figure 7:
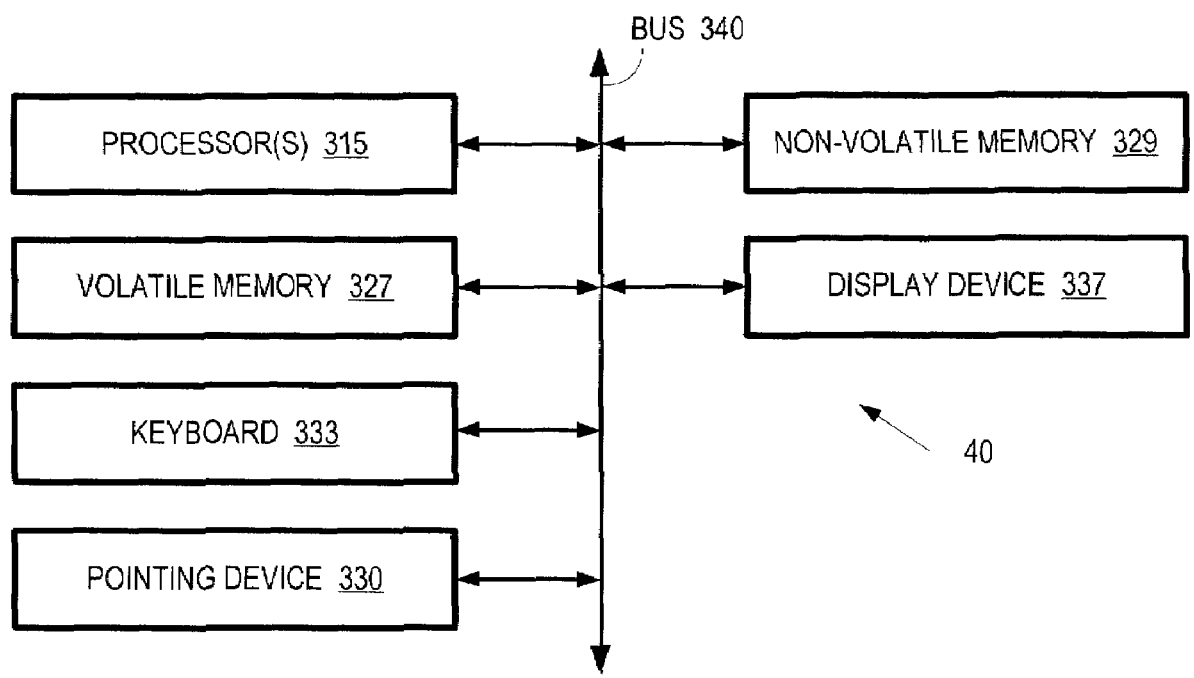
FIG. 7 illustrates a computer system in which at least aspects of the method of FIGS. 2-6 may be practised, according to an embodiment of the present invention.

Referring now to FIG. 6, according to features of an embodiment of the present invention described herein above, both users 610, which may include business users, and e-mail providers 620, may generate revenue from lending e-mail space and at the same time take protection against damage by borrowing e-mail space, as is illustrated very generally in FIG. 6. This is especially useful when unexpected changes occur in e-mail traffic volume. For instance, if e-mail volume for a business e-mail user ranges from 10 to 10,000 per day, there is very little the business can do to predict optimal storage space. So the business may receive 10,000 e-mails on a busy day and not have the storage resources to handle this volume. Likewise, a business may receive e-mails on a given day with large attachments, e.g., many GB's of data. Management of the business may, however, not want to invest heavily in long-term storage space. So borrowing space by a business user 61 0 temporarily may be useful and more economical.

It should be appreciated from the foregoing that the present invention provides numerous benefits, including the following:

a. Individual users need not have exorbitant e-mail storage space that may largely remain unused.

b. Optimal sharing of storage space in a networked organization. Rather than allow each user to have more e-mail storage space that may largely remain unused for many users, it is better to use overflow e-mailboxes that will ensure optimal usage of space.

c. Mobile users and users with hand-held devices can benefit by accessing large amount of e-mail economically and conveniently.

d. A more user-friendly ESMP of dealing with e-mail when the user has no storage space available. Ordinarily the e-mail is bounced back to the sender but here the ESMP provides a viable alternative and provides good security with encryption facility.

e. Optimal sharing of storage space amongst overflow e-mailboxes ensures better utilization of storage space and faster transfers when e-mail is sprayed in a networked organization.

f. Optimal sharing of storage space in a networked organization. Since designated users lend storage space in the same domain or network, access is likely to be faster than when the e-mails were stored in remote overflow e-mailboxes.

g. Users can be charged for using excessive overflow e-mailbox space and can be given credit for lending their e-mailbox space. This can ensure self-regulation to some extent.

h. Individual users can access e-mails they have been copied on even if they are not stored in their e-mailboxes.

i. Optimal sharing of storage space among overflow e-mailboxes ensures better utilization of storage space and faster transfers when e-mail is sprayed in a networked organization.

j. Optimal sharing of storage space in a networked organization, since designated users lend storage space in the same domain or network, access is likely to be faster than when the e-mails were stored in remote overflow e-mailboxes.

k. Users can be charged for using excessive overflow e-mailbox space and can be given credit for lending their e-mailbox space. This can ensure self-regulation to some extent.

l. Individual users can access e-mails they have been copied on even if they are not stored in their e-mailboxes.

Other Variations and General Remarks

The description of the present embodiment has been presented for purposes of illustration, but is not intended to be exhaustive or to limit the invention to the form disclosed. Many modifications and variations will be apparent to those of ordinary skill in the art.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk —read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

What is claimed is:

1. A method for storing e-mail for a first user, the method comprising:

storing at least one capacity limit for the first user's e-mailbox;

receiving an e-mail that increases accumulated storage volume of e-mails in the first user's e-mailbox beyond the at least one capacity limit;

accessing indications of available storage space for e-mailboxes of other users designated as overflow e-mailboxes, wherein such an overflow e-mailbox designation indicates agreement by a user of such an overflow e-mailbox to loan at least a portion of the e-mailbox;

selecting one of the overflow e-mailboxes responsive to indicated availability of storage space therein, wherein the selected overflow e-mailbox is an e-mailbox of a second user; and storing a pointer for the first user responsive to the selection, wherein the pointer points to the selected second user's e-mailbox, wherein space in the first user's e-mailbox is reduced by using a loaned portion of storage space in the second user's e-mailbox for the received e-mail in lieu of space in the first user's e-mailbox.

2. The method of claim 1, wherein if the received e-mail indicates both the first and the second user as recipients, the method comprises the step of:

directing at least a portion of the received e-mail to storage in the second user's e-mailbox instead of storing the received e-mail in the first user's e-mailbox.

3. The method of claim 1, wherein such an overflow e-mailbox includes an overflow portion designated for loan and a user portion designated as not for loan, and wherein if the received e-mail does not include both the first and the second user as recipients, the step of directing the at least a portion of the received e-mail to storage in the second user's e-mailbox instead of storing the received e-mail in the first user's e-mailbox comprises the step of:

directing at least a portion of the received e-mail for the first user to storage in the overflow portion of the second user's e-mailbox instead of storing the received e-mail in the first user's e-mailbox.

4. The method of claim 1 comprising the step of:

storing costs for accessing the respective overflow e-mailboxes, and wherein the costs provide a ranking from least costly to most costly overflow e-mailbox and the selecting of the second user's e-mailbox is further responsive to the cost ranking.

5. The method of claim 2 wherein for e-mail stored for the first user on the second user's e-mailbox, the method comprises the steps of:

polling for availability of space in the first user's e-mailbox; and moving e-mail to the first user's e-mailbox and removing the moved e-mail from the second user's e-mailbox responsive to results of the polling.

6. The method of claim 4 comprising the step of:

computing the overflow e-mailbox costs responsive to i) capacities of the respective overflow e-mailboxes and ii) network logical distances between a server of the first user's e-mailbox and servers of the respective overflow e-mailboxes.

7. The method of claim 2 comprising the step of:

granting credit to the second user for storing the first user's e-mail, wherein the storage credit is responsive to storage space used and time the first user's e-mail is stored in the second user's e-mailbox.

8. The method of claim 2, wherein the first and second e-mailboxes are hosted by respective first and second e-mail service providers, and the method comprises the step of
posting a credit to the second e-mail service provider and a debit to the first e-mail service provider for the using of the loaned portion.

9. The method of claim 1 wherein the overflow e-mailboxes have respective capacity limits and the other users assign as quotas predetermined amounts of their e-mailbox capacity limits for use as the overflow portions of their e-mailboxes, and wherein the accessing indications of available storage space comprises:
determining availability of storage space in the respective overflow e-mailboxes relative to respective overflow e-mailbox capacity limits and overflow quotas.

10. The method of claim 5 comprising the steps of:
splitting the received e-mail into segments;
selecting at least a second one of the overflow e-mailboxes responsive to indicated availability of storage space therein, wherein the second selected overflow e-mailbox is an e-mailbox of a third user; and
directing respective segments for storing in the respective second and third users' e-mailboxes of the instead of in the first user's e-mailbox.

11. A computer program product, stored on a tangible, computer readable medium, for storing e-mail for a first user, said computer program product having instructions for execution by a computer, which, when executed by the computer, cause the computer to implement a method comprising the steps of:
storing at least one capacity limit for the first user's e-mailbox;
receiving an e-mail that increases accumulated storage volume of e-mails in the first user's e-mailbox beyond the at least one capacity limit;
accessing indications of available storage space for e-mailboxes of other users designated as overflow e-mailboxes, wherein such an overflow e-mailbox designation indicates agreement by a user of such an overflow e-mailbox to loan at least a portion of the e-mailbox;
selecting one of the overflow e-mailboxes responsive to indicated availability of storage space therein, wherein the selected overflow e-mailbox is an e-mailbox of a second user; and
storing a pointer for the first user responsive to the selection, wherein the pointer points to the selected second user's e-mailbox, wherein space in the first user's e-mailbox is reduced by using a loaned portion of storage space in the second user's e-mailbox for the received e-mail in lieu of space in the first user's e-mailbox.

12. The computer program product of claim 11, wherein the instructions include instructions for causing the computer to implement a method comprising the step of:
directing at least a portion of the received e-mail to storage in the second user's e-mailbox instead of storing the received e-mail in the first user's e-mailbox.

13. The computer program product of claim 11, wherein such an overflow e-mailbox includes an overflow portion designated for loan and a user portion designated as not for loan, and wherein if the received e-mail does not include both the first and the second user as recipients, the step of directing the at least a portion of the received e-mail to storage in the second user's e-mailbox instead of storing the received e-mail in the first user's e-mailbox comprises the step of:
directing at least a portion of the received e-mail for the first user to storage in the overflow portion of the second user's e-mailbox instead of storing the received e-mail in the first user's e-mailbox.

14. The computer program product of claim 11, wherein the instructions include instructions for causing the computer to implement a method comprising the step of:
granting credit to the second user for storing the first user's e-mail, wherein the storage credit is responsive to storage space used and time the first user's e-mail is stored in the second user's e-mailbox.

15. The computer program product of claim 11, wherein the first and second e-mailboxes are hosted by respective first and second e-mail service providers, and the instructions include instructions for causing the computer to implement a method comprising the step of:
posting a credit to the second e-mail service provider and a debit to the first e-mail service provider for the using of the loaned portion.

16. A computer system comprising:
a processor; and
a storage device connected to the processor, wherein the storage device has stored thereon an e-mail storage management program for controlling the processor, and wherein the processor is operative with the program to execute the program for performing the steps of:
storing at least one capacity limit for the first user's e-mailbox;
receiving an e-mail that increases accumulated storage volume of e-mails in the first user's e-mailbox beyond the at least one capacity limit;
accessing indications of available storage space for e-mailboxes of other users designated as overflow e-mailboxes, wherein such an overflow e-mailbox designation indicates agreement by a user of such an overflow e-mailbox to loan at least a portion of the e-mailbox;
selecting one of the overflow e-mailboxes responsive to indicated availability of storage space therein, wherein the selected overflow e-mailbox is an e-mailbox of a second user; and
storing a pointer for the first user responsive to the selection, wherein the pointer points to the selected second user's e-mailbox, wherein space in the first user's e-mailbox is reduced by using a loaned portion of storage space in the second user's e-mailbox for the received e-mail in lieu of space in the first user's e-mailbox.

17. The computer system of claim 16, wherein the processor is operative with the program to execute the program for performing the step of:
directing at least a portion of the received e-mail to storage in the second user's e-mailbox instead of storing the received e-mail in the first user's e-mailbox.

18. The computer system of claim 16, wherein the processor is operative with the program to execute the program for performing the step of:
wherein such an overflow e-mailbox includes an overflow portion designated for loan and a user portion designated as not for loan, and wherein if the received e-mail does not include both the first and the second user as recipients, the step of directing the at least a portion of the received e-mail to storage in the second user's e-mailbox instead of storing the received e-mail in the first user's e-mailbox comprises the step of:
directing at least a portion of the received e-mail for the first user to storage in the overflow portion of the second user's e-mailbox instead of storing the received e-mail in the first user's e-mailbox.

19. The computer system of claim 16, wherein the processor is operative with the program to execute the program for performing the step of:

granting credit to the second user for storing the first user's e-mail, wherein the storage credit is responsive to storage space used and time the first user's e-mail is stored in the second user's e-mailbox.

20. The computer system of claim 16, wherein the first and second e-mailboxes are hosted by respective first and second e-mail service providers and the processor is operative with the program to execute the program for performing the step of:

posting a credit to the second e-mail service provider and a debit to the first e-mail service provider for the using of the loaned portion.

* * * * *